(12) United States Patent
Donoho

(10) Patent No.: US 8,934,319 B2
(45) Date of Patent: Jan. 13, 2015

(54) PORTABLE NOISEMAKER

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 181 days.

(21) Appl. No.: 13/655,292

(22) Filed: Oct. 18, 2012

(65) Prior Publication Data

US 2014/0112105 A1 Apr. 24, 2014

(51) Int. Cl.
*A01M 29/18* (2011.01)

(52) U.S. Cl.
CPC .................... *A01M 29/18* (2013.01)
USPC .................................................. 367/139

(58) Field of Classification Search
CPC ........................................... A01M 29/18
USPC ............... 367/139; 340/384.2; 119/713, 719
See application file for complete search history.

(56) References Cited

U.S. PATENT DOCUMENTS

| 4,922,468 | A | * | 5/1990 | Menezes ...................... 367/139 |
| 5,966,075 | A | | 10/1999 | Blanks |
| 6,570,494 | B1 | | 5/2003 | Leftridge, Sr. |
| 7,227,452 | B1 | | 6/2007 | Frost |
| 7,324,409 | B1 | * | 1/2008 | Zweesaardt ................. 367/139 |
| 2011/0144829 | A1 | * | 6/2011 | Kim et al. ................... 367/139 |
| 2012/0113754 | A1 | | 5/2012 | Husseiny et al. |
| 2013/0014692 | A1 | | 1/2013 | Lee |
| 2013/0077446 | A1 | * | 3/2013 | Kasper ......................... 367/139 |
| 2014/0112105 | A1 | * | 4/2014 | Donoho ....................... 367/139 |

FOREIGN PATENT DOCUMENTS

| CN | 102499227 A | 6/2012 |
| JP | 2002159257 A | 6/2002 |
| JP | 2010246535 A | 11/2010 |

OTHER PUBLICATIONS

Dog Repeller App; May 12, 2011; https://play.google.com/store/apps/details?id=com.nikolaylyubenov.dogsrepeller.*
Animal Repeller App; Sep. 11, 2012; https://play.google.com/store/apps/details?id=com.metro.dev.utils.animal.repel.*
Alibaba.com, search for "bird call" product results, http://www.alibaba.com/showroom/bird-call.html, screen capture Jul. 30, 2012.
"New Model of CP-387", http://szusbchina.en.alibaba.com/product/598228725-213538319/Newest_bird_call_with_remote_control_ang_timer.html, screen capture Jul. 30, 2012.
"Hunting mp3 bird call with timer (200m remote, 12V, 15keys)", http://szhaiwang.en.alibaba.com/product/503342522-212523650/hunting_mp3_bird_call_with_timer_200m_remote_12V_15keys_.html, screen capture Jul. 30, 2012.

(Continued)

*Primary Examiner* — Daniel Pihulic
(74) *Attorney, Agent, or Firm* — Fish & Tsang LLP

(57) ABSTRACT

An animal deterrent has a housing and a power source, a processor, and a sound emitter. The deterrent can be programmed by a user to perform one or more tasks. The deterrent can be manipulated via a touch-screen, a button, or a remote control and receiver. A sensor can be included to send a sensor signal when a temperature, sound, light, or other environmental condition is detected.

18 Claims, 3 Drawing Sheets

(56) References Cited

OTHER PUBLICATIONS

"Hunting mp3 bird call with timer (200m remote, 12V, 15keys) CP-370B", http://szelong.en.alibaba.com/productshowimg/553147521-213479111/hunting_mp3_bird_call_with_timer_200m_remote_12V_15keys_CP_370B.html, screen capture Jul. 30, 2012.

"Hunting bird calls", http://www.alibaba.com/product-gs/439944567/Hunting_bird_calls.html, screen capture Jul. 30, 2012.

\* cited by examiner

PORTABLE NOISEMAKER

FIELD OF THE INVENTION

The field of the invention is bird deterrent devices.

BACKGROUND

The background description includes information that may be useful in understanding the present invention. It is not an admission that any of the information provided herein is prior art or relevant to the presently claimed invention, or that any publication specifically or implicitly referenced is prior art.

Birds sometimes cause harm to humans, gardens, patios, golf courses, warehouses, loading docks, poles, wires, trees, buildings, and various other animals and structures. Various devices exist that attempt to deter or repel certain insects or pests using ultrasonic sound waves, but existing devices suffer various limitations.

U.S. Pat. No. 6,570,494 to Leftridge, Sr. discloses a mosquito guard that can be hung or mounted outdoors. U.S. Pat. No. 7,227,452 to Frost discloses an animal deterring device that emits ultrasound. U.S. Pat. No. 5,966,075 to Blanks discloses a motion-sensitive bird repelling device that makes noise when prompted by motion detectors. U.S. Patent Application Publication No. 2012/0113754 to Husseiny discloses an avian denial infrasound system that broadcasts continuous infrasonic signals to create a bird-free infrasound active zone.

The above cited references, however, apparently fail to provide a versatile or programmable device, or a device that can be manipulated remotely.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved bird deterrents.

SUMMARY OF THE INVENTION

The inventive subject matter provides apparatus, systems and methods for deterring birds and other animals. In one aspect of the inventive subject matter, a bird deterrent device is configured to emit a sound (e.g., an ultrasonic sound). In some devices, the sound can come from a database storing a plurality of sound files.

If a deterrent device comprises or accesses a database, it is contemplated that the deterrent device can be configured to synchronize with another device or server having a database. Such a sync feature can allow a deterrent device's database to stay up to date with a data change in a different device or server. It is contemplated that a database can be stored in any suitable device or computer, including for example, a cloud server, computer server, a cellular phone, a laptop computer, a tablet computer, a smart phone, or any other suitable device.

In one aspect of the inventive subject matter, a bird deterrent device can comprise a sensor that detects an environmental property (e.g., a temperature, a light, a sound, etc.) and produce a sensor signal. In another aspect of the inventive subject matter, a processor in the device can be configured to cause a sound emitter to emit a sound as a function of the sensor signal (e.g., upon receipt of the sensor signal).

Various objects, features, aspects and advantages of the inventive subject matter will become more apparent from the following detailed description of preferred embodiments, along with the accompanying drawing figures in which like numerals represent like components.

DETAILED DESCRIPTION OF THE DRAWINGS

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Figure 1:
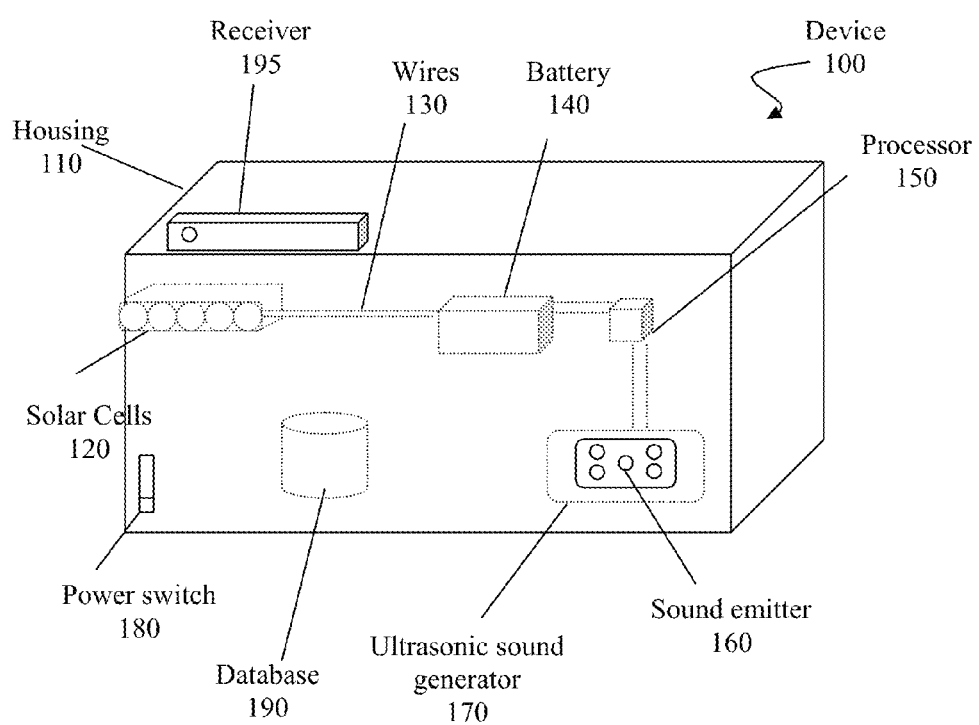
FIG. 1 is a schematic of one embodiment of a bird deterrent device.

In FIG. 1, bird deterrent device 100 comprises a waterproof, corrosion resistant, and portable housing 110 that at least partially houses a sound emitter 160 (e.g., speaker, etc.), a processor 150, and at least one power supply (e.g., solar cell 120, battery 140, a rechargeable battery, an alkaline battery, a lithium battery, etc.), coupled to one another via wires 130. Device 100 can be used in any suitable environment(s), including for example, gardens, forests, parks, roofs, buildings, camping sites, parks, wind farms, farms, and airports.

Device 100 has a battery 140 that is preferably rechargeable via photovoltaic cell 120. However, it is contemplated that a device of the inventive subject matter can comprise any suitable power supply, including for example, a wall socket, a power cord, non-rechargeable batteries, etc.

Some devices can comprise an ultrasonic sound generator 170 and sound emitter 160, which can produce and emit sounds at frequencies above 20 kilohertz. One example of an ultrasonic sound generator and sound emitter is a tweeter (or other suitable speaker driver) and speaker. It is contemplated that the ultrasound generator 170 can be included in the sound emitter 160, or can be a separate device coupled with the sound emitter 160.

It is also contemplated that the device 100 can comprise a sound generator and sound emitter configured to produce infrasound (e.g., lower than 20 hertz) and sound within human hearing range (e.g., 20 hertz to 20 kilohertz).

In some preferred embodiments, processor 150 is communicatively coupled to database 190, which is configured to store a plurality of sound files. Database 190 can store the sound files in any suitable format, including for example, MP3 files, Waveform Audio File Formal (WAV) files, AIFF, AU, FLAC, Apple Lossless, WMA Lossless, and WMA Lossy. Preferred s files comprise sound waves (including ultrasound sound waves) representative of various bird predator calls.

Some contemplated devices are programmable. For example, device 100 can be programmed or reprogrammed by a user or a manufacturer to perform a specific task, e.g., play different sound files at different times of the day, emit a light or a sound depending on a time of day or environmental condition, change sound volume throughout the day, automatically power on or off at a given time or event, play a sound file on a periodic basis, and so forth. Device 100 can be programmed via remote control, touch-screen, buttons, remotely via an intranet or internet, or any other suitable method. Some devices can alternatively or additionally have manual features, such as a power switch 180, receiver 195 and a remote control device (not shown), or buttons 240 (see FIG. 2).

The device can comprise or be coupled with a cloud database, such as a Dropbox™, Syncplicity™, FolderShare™, SyncToy™ 2.0, SyncBack™, or any other suitable cloud database. In such embodiments, it is contemplated that the device can automatically sync with the cloud database. This advantageously can ensure the device 100 includes the appropriate sounds. Contemplated databases can be local or remote from the device and can be configured to sync with a second, different database. The second database is sometimes stored in a user device such as a mobile telephone, a laptop computer, a tablet computer, but can also be stored on any physical server or cloud server that can be accessed by one or more device users.

In another aspect of the inventive subject matter, a bird deterrent device 100 comprises a receiver 195. Receiver 195 can be coupled to sound emitter 160 and configured to receive a signal from a remote control or other control device. Contemplated signals include infrared signals, radio frequency signals, or any other suitable signals. All commercially suitable remote control devices and receivers are contemplated.

Device 100 can also comprise a geo-location tool (e.g., an application, GPS chip, etc.) that obtains location information related to the device 100. The device 100 can be programmed to play different sound files depending on the location of the device.

Figure 2:
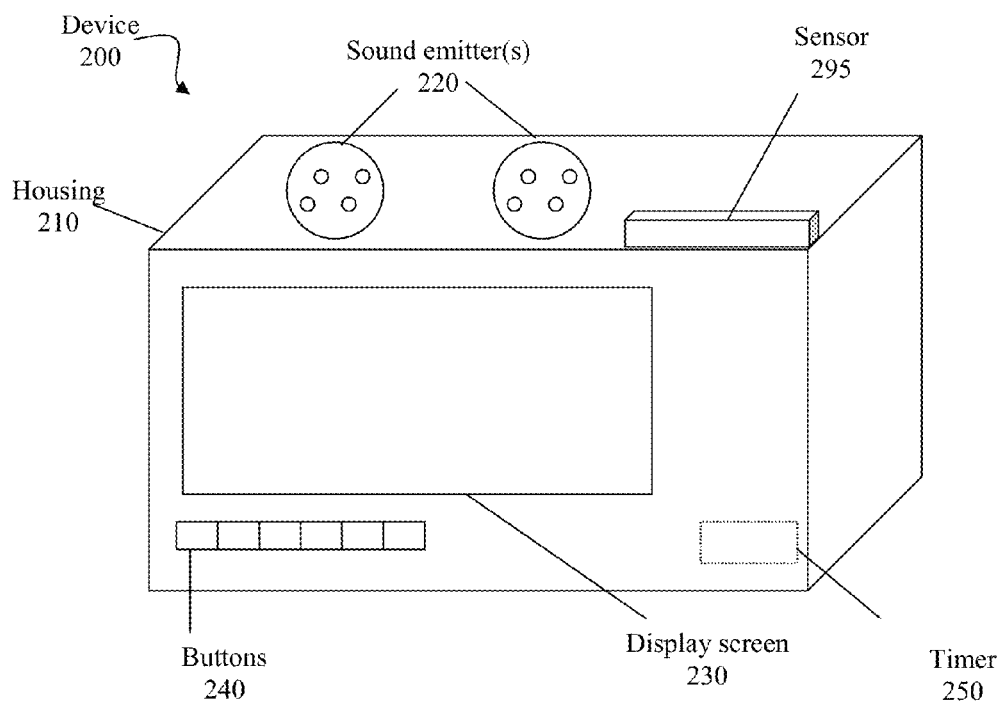
FIG. 2 is a schematic of another embodiment of a bird deterrent device.

In FIG. 2, device 200 comprises a user interface provided via display screen 230. It is contemplated that display screen 230 can be a touch-screen, or be coupled with buttons 240 to allow a user to interact with device 200. Device 200 further comprises a sensor 295, which can compose or be coupled to the housing 210.

A sensor, such as sensor 295, can be configured to detect a temperature, a movement, a light, a sound, a change in temperature, a change in brightness, a change in sound, or any other suitable environmental condition. Once sensor 295 detects an environmental condition, sensor 295 can produce a sensor signal. This sensor signal can be received by a processor, which can cause an action to occur, depending on the signal received. Exemplary actions include for example, a change in sound emitted by the sound emitter(s) 220, a powering on or off, an increase or decrease in volume, a turning on or off of a light, or a change in the frequency of the sound played.

For example, a motion sensor could be configured to detect a rapid movement (e.g., wing flapping, etc.), and produce a signal that is received by a processor. The processor can then cause a device to power on and play a sound file every two minutes. As another example, a light sensor can be configured to detect a brightness (e.g., daylight, moon light, night-time, etc.), and send a signal to a processor. The processor can then increase the volume of a sound file that is already configured to play every ten minutes.

Any existing sensor (e.g., a motion sensor, etc.) can be used in a bird deterrent device of the inventive subject matter. A sensor can be coupled to a feedback device, such as a sound emitter or a screen. The feedback device is preferably configured to notify a user of a detection of a condition. When the user receives a notification, the user can manually change a setting of the device via a remote control, or entry of an input to a touchscreen or button.

In some embodiments, a bird deterrent device can include a timer 250 configured to automatically power down device 200 and thereby extend battery life. Timer 250 can be configured to turn off device 200 or portion thereof after 1, 5, 10, 15, or even 20 or more hours. Such a component can allow a user to schedule times for the device or portion thereof to shut down or power on automatically. Timer 250 can also be used to play sounds periodically (random or predetermined), or between certain times of the day.

It is also contemplated that a device can be configured to change the volume or frequency of sounds emitted based at least in part on the amount of battery left. This can advantageously ensure that the device stays on and emits sounds for a specified time period.

Figure 3:
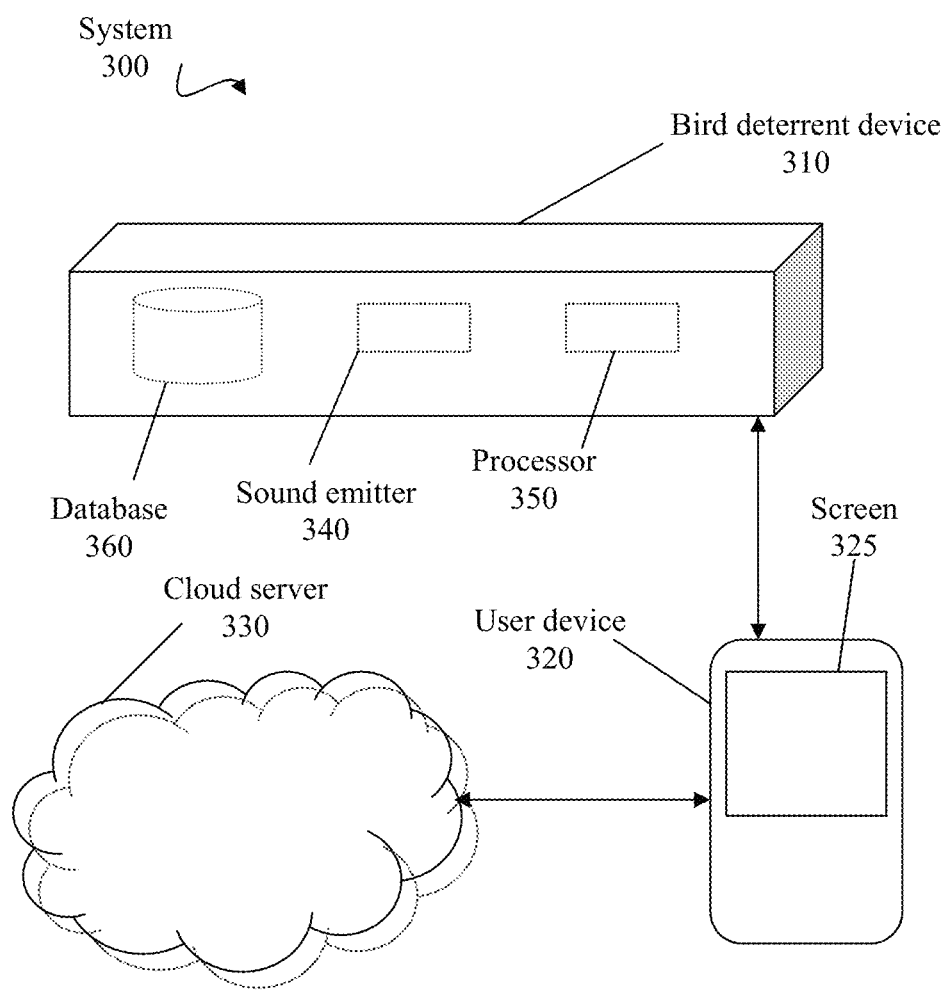
FIG. 3 is a schematic of a bird deterrent system.

In FIG. 3, a bird deterring system 300 is shown. System 300 comprises a bird deterrent device 310 that is communicatively coupled (e.g., wireless internet, intranet, Bluetooth, WiFi, etc.) with user device 320. Bird deterrent device 310 comprises a sound emitter 340, and a processor 350 that is communicatively coupled with a database 360.

User device 320 can comprise a display 325 that is configured to provide a user interface. In some embodiments, a user device can be included in or housed in a bird deterrent device. User device 320 is communicatively coupled with a cloud server 330, which comprises a database having stored sound files. It is contemplated that device 310 or 320 can comprise a database sync tool that allows database 360 to sync (automatically or manually) with a database coupled to user device 320. Alternatively, sound files can be pushed from server 330 to database 360 as the sound files are added to server 330.

Device 310 can be simply placed in an area, or mounted or otherwise secured to an area in any suitable manner, including for example, screw(s), mounting pole(s), glue, hook and loop fastener(s), or hanging loop(s) (e.g., rope, nylon cord, etc.).

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A bird deterrent device, comprising:
   a housing that houses a sound emitter, a processor, a geo-location tool, and a power supply;
   wherein the processor is coupled to a first database that is configured to allow storage of a plurality of sound files; and
      wherein the first database is configured to sync with a second database that is remote to the first database; and
   wherein the processor is programmed to:
      obtain location information associated with the device from the geo-location tool;
      select a sound file from the plurality of sound files based on the obtained location information; and
      cause the sound emitter to output the selected sound file.

2. The bird deterrent device of claim 1, wherein the plurality of sound files comprises at least one ultrasonic predator call file.

3. The bird deterrent device of claim 2, wherein the sound emitter is coupled to an ultrasonic sound generator.

4. The bird deterrent device of claim 2, wherein the sound emitter comprises an ultrasonic sound generator.

5. The bird deterrent device of claim 1, wherein the device is configured to receive instructions from a remote device.

6. The bird deterrent device of claim 1, further comprising a power switch.

7. The bird deterrent device of claim 1, further comprising a photovoltaic cell.

8. The bird deterrent device of claim 1, wherein the power supply includes a rechargeable battery.

9. The bird deterrent device of claim 1, wherein the first database is local to the device.

10. The bird deterrent device of claim 1, further comprising a receiver coupled to the sound emitter, wherein the receiver is configured to receive at least one of an infrared signal and a radio frequency signal.

11. A bird deterrent device, comprising:
    a housing that houses a sound emitter, a geo-location tool, a processor and a power supply;
    wherein the processor is coupled to a first database configured to allow storage of a plurality of sound files; and
    a sensor coupled to the housing, wherein the sensor is configured to:
       detect at least one of a temperature, a light, a motion and a sound; and produce a sensor signal; and
    wherein the processor is configured to:
       obtain location information associated with the device from the geo-location tool;
       select a sound file from the plurality of sound files based on the obtained location information;
       cause the sound emitter to output the selected sound file as a sound emission; and
       cause at least one of a change in volume of the sound emission,
          a change in frequency of the sound emission, a powering on, and a powering off, as a function of the sensor signal.

12. The bird deterrent device of claim 11, further comprising a feedback device coupled to the sensor.

13. The bird deterrent device of claim 12, wherein the feedback device is a second sound emitter configured to alert a user of an environmental condition.

14. The bird deterrent device of claim 13, wherein the environmental condition is a temperature.

15. The bird deterrent device of claim 13, wherein the second sound emitter is different from the first sound emitter.

16. The bird deterrent device of claim 11, further comprising a timer.

17. The bird deterrent device of claim 11, wherein the sensor is configured to detect a motion, and the processor is configured to cause a sound emission.

18. The bird deterrent device of claim 11, further comprising a screen configured to provide an interface to a user.

* * * * *